United States Patent
Himeno (10) Patent No.: US 8,160,622 B2
(45) Date of Patent: Apr. 17, 2012

(54) RECEIVING AND SENDING METHOD OF MOBILE TV PHONE AND MOBILE TV PHONE TERMINAL

(75) Inventor: Yasuhiro Himeno, Tokyo (JP)

(73) Assignee: NEC Corporaton, Tokyo (JP)

( * ) Notice: Subject to any disclaimer, the term of this patent is extended or adjusted under 35 U.S.C. 154(b) by 420 days.

(21) Appl. No.: 12/349,166

(22) Filed: Jan. 6, 2009

(65) Prior Publication Data
US 2009/0124283 A1    May 14, 2009

Related U.S. Application Data

(62) Division of application No. 11/098,499, filed on Apr. 5, 2005, now Pat. No. 7,493,139.

(30) Foreign Application Priority Data

Apr. 6, 2004    (JP) ................................ 2004-112357

(51) Int. Cl.
*H04Q 7/20*    (2006.01)

(52) U.S. Cl. ...... 455/466; 455/566; 455/90.1; 455/90.2; 455/130

(58) Field of Classification Search .................. 455/466, 455/566, 90.1, 90.2, 90.3, 73, 130; 348/14.01
See application file for complete search history.

(56) References Cited

U.S. PATENT DOCUMENTS

| | | | |
|---|---|---|---|
| 6,459,906 B1 * | 10/2002 | Yang | 455/556.1 |
| 6,771,974 B1 * | 8/2004 | Sim et al. | 455/466 |
| 7,107,067 B2 * | 9/2006 | Tuilier | 455/466 |
| 7,209,705 B2 * | 4/2007 | Moles et al. | 455/41.2 |
| 7,224,999 B1 * | 5/2007 | Yamaguchi | 455/566 |
| 7,251,696 B1 | 7/2007 | Horvitz | |
| 2002/0181671 A1 | 12/2002 | Logan | |
| 2003/0109246 A1 | 6/2003 | Shimizu et al. | |
| 2003/0126288 A1 | 7/2003 | Tsurusaki et al. | |
| 2004/0113929 A1 * | 6/2004 | Matsuzaki | 345/700 |
| 2004/0203667 A1 | 10/2004 | Schroeder et al. | |

FOREIGN PATENT DOCUMENTS

EP    1035748 A1    9/2000

* cited by examiner

*Primary Examiner* — Tuan Pham (74) *Attorney, Agent, or Firm* — Sughrue Mion, PLLC (57) ABSTRACT

A unit for realizing a TV phone by using an image and a character message by a relatively simple method in a manner mode is provided. In the manner mode of one mobile TV phone terminal, a control unit for controlling the operation of the one mobile TV phone terminal prohibits the sound input via a microphone of the one mobile TV phone terminal and the sound output via a speaker and operates an SMS function with a TV phone function. A line between the one mobile TV phone terminal and another one is connected, an SMS message is created by operating a key input unit of the one mobile TV phone terminal, and a send key is pressed. Then, the message data is sent to the other mobile TV phone terminal via one base station, an SMS server, and another base station. A display unit of the other mobile TV phone terminal displays the message together with the image sent via a TV phone exchange.

6 Claims, 7 Drawing Sheets

RECEIVING AND SENDING METHOD OF MOBILE TV PHONE AND MOBILE TV PHONE TERMINAL

This application is a Divisional Application of U.S. patent application Ser. No. 11/098,499 which claims priority to prior Japanese Patent Application No. 2004-112357 filed Apr. 6, 2004, the disclosure of which including specification, drawings and claims is incorporated herein by reference in its entirety.

BACKGROUND OF THE INVENTION

1. Field of the Invention

The present invention relates to a mobile television (TV) phone terminal, and more particularly, to a receiving and sending method of a mobile TV phone and a mobile TV phone terminal in a manner mode.

2. Description of the Related Art

Recently, a mobile phone with a TV function has been spread. For example, Japanese Unexamined Patent Application Publication (JP-A) No. 6-292195 (Patent Document 1) discloses a mobile radio TV phone, in which a phone number of a receiver, or a called party, is inputted from a key operating unit of a main body of a mobile terminal device while visually checking it on a display unit of a liquid crystal monitor. A call is generated by sending a radio signal via a control and radio circuit and an antenna of the device main body, the line is connected by radio to the terminal of the receiver, and an audio, image, or, character signal is received and sent between the terminals via the radio signal serving as a medium. Sound information sent to the terminal of the receiver is inputted as a sound signal by a microphone, and image information is picked-up as an image by a camera in the mobile radio TV phone and is sent to the terminal of the receiver. The sound information received in the terminal of the receiver is outputted as sound via a speaker or ear phone, and an image or character information is displayed as a video image on the display unit.

Further, Japanese Unexamined Patent Application Publication (JP-A) No. 2000-332904 (Patent Document 2) discloses a mobile TV phone terminal. The mobile TV phone terminal comprises image pick-up means which captures an image, display means, sound input means, sound output means, operating means which is operated in various operations and in the input operation of character data, communication means which communicates sound data, character data, and image data, email creating means which creates an email by using characters inputted by the operation of the operating means. The mobile TV phone terminal further includes control means which creates an email with an image that is formed by adding the image data of, e.g., the face of a sender to the character data created by the email creating means in response to an instruction for creating the email with the image from the operating means and which sends the email with the image by the communication means in response to the instruction for sending the email with the image from the operating means.

Furthermore, Japanese Unexamined Patent Application Publication (JP-A) No. 2002-118649 (Patent Document 3) and Japanese Unexamined Patent Application Publication (JP-A) No. 2003-204378 (Patent Document 4) disclose a TV phone system. The system comprises a relay station connected via a communication carrier network, a mobile TV phone which communicates multiplex data that is obtained by multiplexing video, voice, and communication data by exchanging the lines via a radio network and a communication carrier network, a data multiplexing and demutiplexing device which separates the communication data to the Internet from the multiplex data that is being communicated by exchanging in the communication carrier network, which sends the separated communication data to the Internet, and which multiplexes response data from the Internet for the communication data to the multiplex data. The TV phone system further includes an Internet gateway which connects the communication carrier network and the Internet, and a service provider which creates response data for the communication data separated by the data multiplexing and separating device. In the TV phone system, an application for the mobile TV phone and an access application to the Internet are operated in parallel therewith in the mobile TV phone terminal, thereby simultaneously accessing the Internet and receiving and sending an email and browsing a homepage while making a phone call by the mobile TV phone.

Conventional methods for limiting the communication of a mobile phone in a manner mode are proposed, having means for setting the manner mode against the use of a mobile phone in the place in which externally output sound should be refrained, e.g., in the train or theater (e.g., Japanese Unexamined Patent Application Publication (JP-A) No. 2003-32746 (Patent Document 5)). To the incoming call in the manner mode, a message indicating that the communication is not allowed is sent to a caller.

As disclosed in Japanese Unexamined Patent Application Publication (JP-A) No. 2000-332904 (Patent Document 2), the email with the image is received or sent for communication without externally outputting the sound. However, according to this method, image data with the large amount of data needs to be sent as an email via an email server, and there is a problem that the original TV phone function is not effectively used.

By using the mobile TV phone terminal disclosed in Japanese Unexamined Patent Application Publication (JP-A) No. 2002-118649 (Patent Document 3) and Japanese Unexamined Patent Application Publication (JP-A) No. 2003-204378 (Patent Document 4), it is possible to receive and send the email while communicating the image data with the TV phone function. That is, it is possible to communicate with another party using the email together the image data while refraining from generating voice in the TV phone. However, in this case, an email application needs to start, independently of the TV phone function. The operation is troublesome that the email address of the receiver needs to additionally be inputted.

SUMMARY OF THE INVENTION

It is an object of the present invention to provide mobile radio phone terminal for realizing a TV phone by an image and a character message by relatively simple method and operation in a manner mode in consideration of the above problems.

It is another object of the present invention to provide a receiving and sending method of a mobile TV phone by using images and verbal messages without refraining voice.

According to the first aspect of the present invention, a receiving and sending method of a mobile TV phone prohibits the sound output via a receiving speaker and the sound via a speaking microphone of the mobile TV phone, starts an SMS (Short Message Service) function together with a TV phone function, sends character data inputted from a key input unit of the terminal via an SMS server by the SMS function, and displays a message from a receiver terminal received by the SMS function and an image from the receiver terminal received by the TV phone function on the display unit of the terminal, upon executing the communication of the TV phone function in the manner mode, by using the TV phone function, the SMS function, and a setting and resetting function of the manner mode.

According to the second aspect of the present invention, a receiving and sending method of a mobile TV phone prohibits the sound output via a receiving speaker and the sound output via a speaking microphone of the mobile TV phone, starts a phone book function and an email function together with a TV phone function, searches for an email address by the phone book function, sends character data inputted from a key input unit of the mobile TV phone to the email address by the email function via an email server, and displays a message from a receiver terminal received by the email function and an image from a receiver terminal received by the TV phone function on the display unit of the mobile TV phone, upon executing the communication of the TV phone function in the manner mode, by using the TV phone function, the phone book function, the email function, and a setting and resetting function of the manner mode.

According to the third aspect of the present invention, a receiving and sending method of a mobile TV phone prohibits the sound output via a receiving speaker and the sound input via a speaking microphone of the mobile TV phone, starts a function for converting character data into sound data and sending the converted sound data and a function for converting the received sound data into the character data together with a TV phone function, converts the character data inputted from a key input unit of the mobile TV phone into a voice signal and sends the voice signal, and displays an image from a receiver terminal received by the TV phone function and a message obtained by converting the voice signal received from the receiver terminal into the character data on the display unit of the terminal, upon executing the communication of the TV phone function in the manner mode, by using the TV phone function, the function for converting the character data into the voice signal and sending the converted voice signal, the function for converting the received voice signal into the character data, and a setting and resetting function of the manner mode.

According to the fourth aspect of the present invention, a mobile radio terminal having manner-mode setting/resetting means with a TV phone function and an SMS (Short Message Service) function, comprises: means for prohibiting the sound input via a microphone and the sound output via a speaker of the mobile radio terminal and starting the SMS function together with the TV phone function, upon executing the communication by the TV phone function in the manner mode set by the manner-mode setting/resetting means; means for sending, via an SMS server by the SMS function, character data inputted from a key input unit of the mobile radio terminal; and means for displaying, on a display unit of the mobile radio terminal, a message from sender's terminal received by the SMS function and an image from the sender's terminal received by the TV phone function.

According to the fifth aspect of the present invention, a mobile radio terminal having manner-mode setting/resetting means with a TV phone function, a phone book function, and an email function, comprises: means for prohibiting the sound input via a microphone and the sound output via a speaker of the mobile radio terminal and starting the phone book function and the email function together with the TV phone function, upon executing the communication by the TV phone function in the manner mode set by the manner-mode setting/resetting means; means for sending, via an email server by the email function, character data inputted from a key input unit of the mobile radio terminal to an email address searched by the phone book function; and means for displaying, on a display unit of the mobile radio terminal, a message from sender's terminal received by the email function and an image from the sender's terminal received by the TV phone function.

According to the sixth aspect of the present invention, a mobile radio terminal having manner-mode setting/resetting means with a TV phone function, a character data/voice converting function for converting character data into a voice signal, and a voice/character data converting function for converting the voice signal into the character data, comprises: means for prohibiting the sound input via a microphone and the sound output via a speaker of the mobile radio terminal and starting the character data/voice converting function and the voice/character data converting function together with the TV phone function, upon executing the communication by the TV phone function in the manner mode set by the manner-mode setting/resetting means; means for converting character data inputted from a key input unit of the mobile radio terminal into a voice signal by the character data/voice converting function and sending the converted voice signal; and means for displaying, on a display unit of the mobile radio terminal, an image from sender's terminal received by the TV phone function and a message obtained by converting the received voice signal from the sender's terminal into the character data by the voice/character data converting function.

In accordance with the present invention, in the place where the sound or voice should not externally generated, such as in the train or theater, the TV phone serving as a mobile terminal is used in the manner mode to automatically receive and send the image and the character message using the SMS function. Thus, the message is received/sent in real time while viewing the receiver's face with the relatively simple operation without generating the sound or voice.

According to the present invention, in the situation where the speech via the phone is not to be heard by people around the phone, the manner mode is manually set, thereby automatically switching the mobile phone terminal to the TV phone using the image and the character message. Thus, the TV phone is used without hesitation to those around.

DESCRIPTION OF THE PREFERRED EMBODIMENTS

Figure 1:
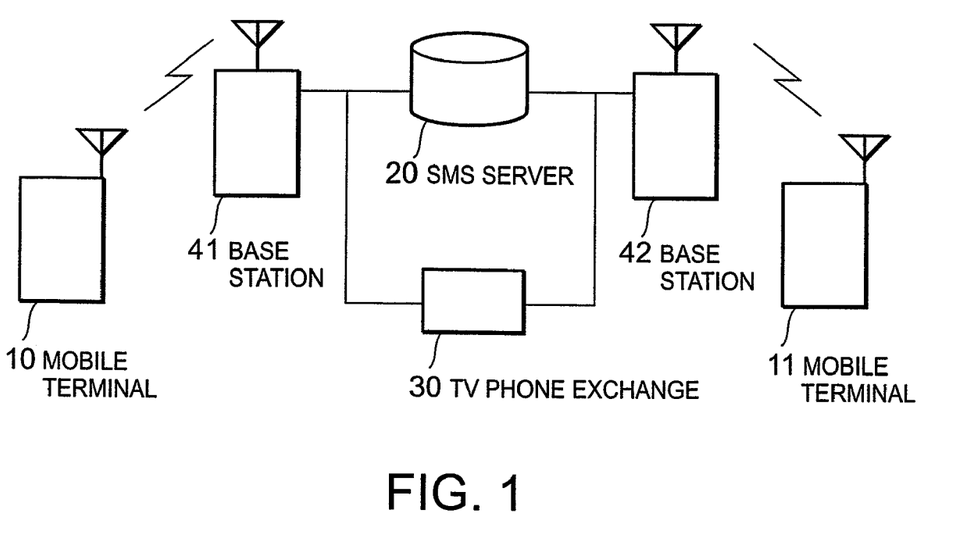
FIG. 1 is a diagram showing the entire structure of a mobile TV phone system according to the first embodiment of the present invention.

FIG. 1 is a diagram showing the entire structure of a mobile TV phone system according to the first embodiment of the present invention. In FIG. 1, the mobile TV phone system comprises mobile TV phone terminals 10 and 11, an SMS server 20, a TV phone exchange 30, and base stations 41 and 42.

Figure 2:
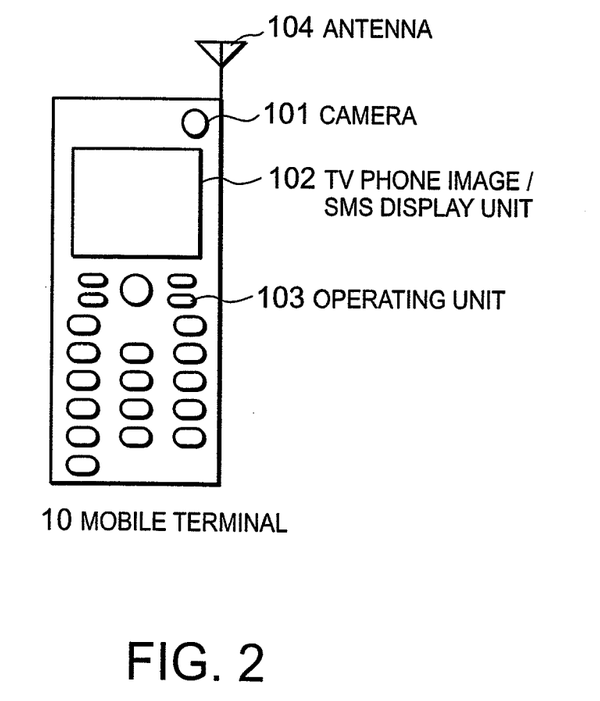
FIG. 2 is an outline view showing an example of a mobile TV phone terminal having a TV phone function and an SMS (Short Message Service) function according to the first embodiment.
Figure 3:
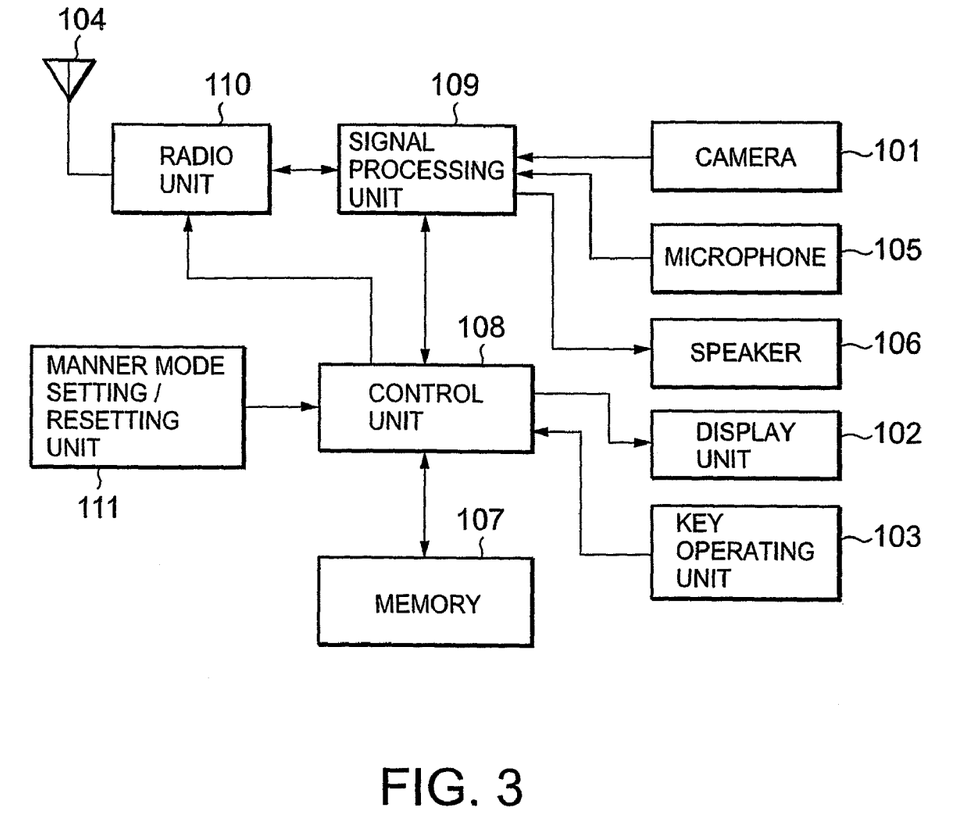
FIG. 3 is a block diagram schematically showing an example of a mobile TV phone terminal having the TV phone function and the SMS function according to the first embodiment.

FIGS. 2 and 3 are an outline diagram and a block diagram showing examples of the mobile TV phone terminals 10 and 11 having a TV phone function and an SMS function according to the first embodiment, respectively. In FIGS. 2 and 3, each of the mobile TV phone terminals 10 and 11 comprises a camera 101, a TV phone image/SMS display unit 102, an operating unit 103, an antenna 104, a microphone 105, a speaker 106, a memory 107, a control unit 108, a signal processing unit 109, a radio unit 110, and a manner mode setting/resetting unit 111.

The control unit 108 reads various control programs stored in the memory 107 in accordance with an instruction from the operating unit 103, and controls operations of the mobile TV phone terminal in accordance with the control programs. According to the first embodiment, the memory 107 stores an SMS application program, and the control unit 108 reads, from the memory 107, the SMS application program in accordance with an external instruction to execute the SMS function. Further, the control unit 108 suppresses incoming ring of the mobile TV phone terminal 10 upon receiving a manner mode setting signal from the manner mode setting/resetting unit 111, for example, switches the incoming ring to an incoming notification using a vibrator and controls the operation for prohibiting the sound input via the speaking microphone 105 and the sound output via the receiving speaker 106.

Since the SMS system is well-known by the person in the art as disclosed in, for example, Japanese Examined Patent Application Publication (JP-A) No. 2002-502570 (Patent Document 6) and Japanese Examined Patent Application Publication (JP-A) No. 2003-348008 (Patent Document 7), a detailed description thereof is omitted. The manner mode setting/resetting unit 111 can comprise automatic manner-mode setting/resetting means which automatically sets the manner mode to the mobile TV phone terminal upon receiving a specific signal, by way of radio, audio wave or light at the place for prohibiting the external output of sound and automatically resets the manner mode upon moving to the range out of the specific-signal receiving area, or manual manner-mode setting/resetting means. Since it is well known by the person in the art that the mobile radio phone comprises the manner mode setting/resetting means and thus a detailed description thereof is omitted.

Figure 4:
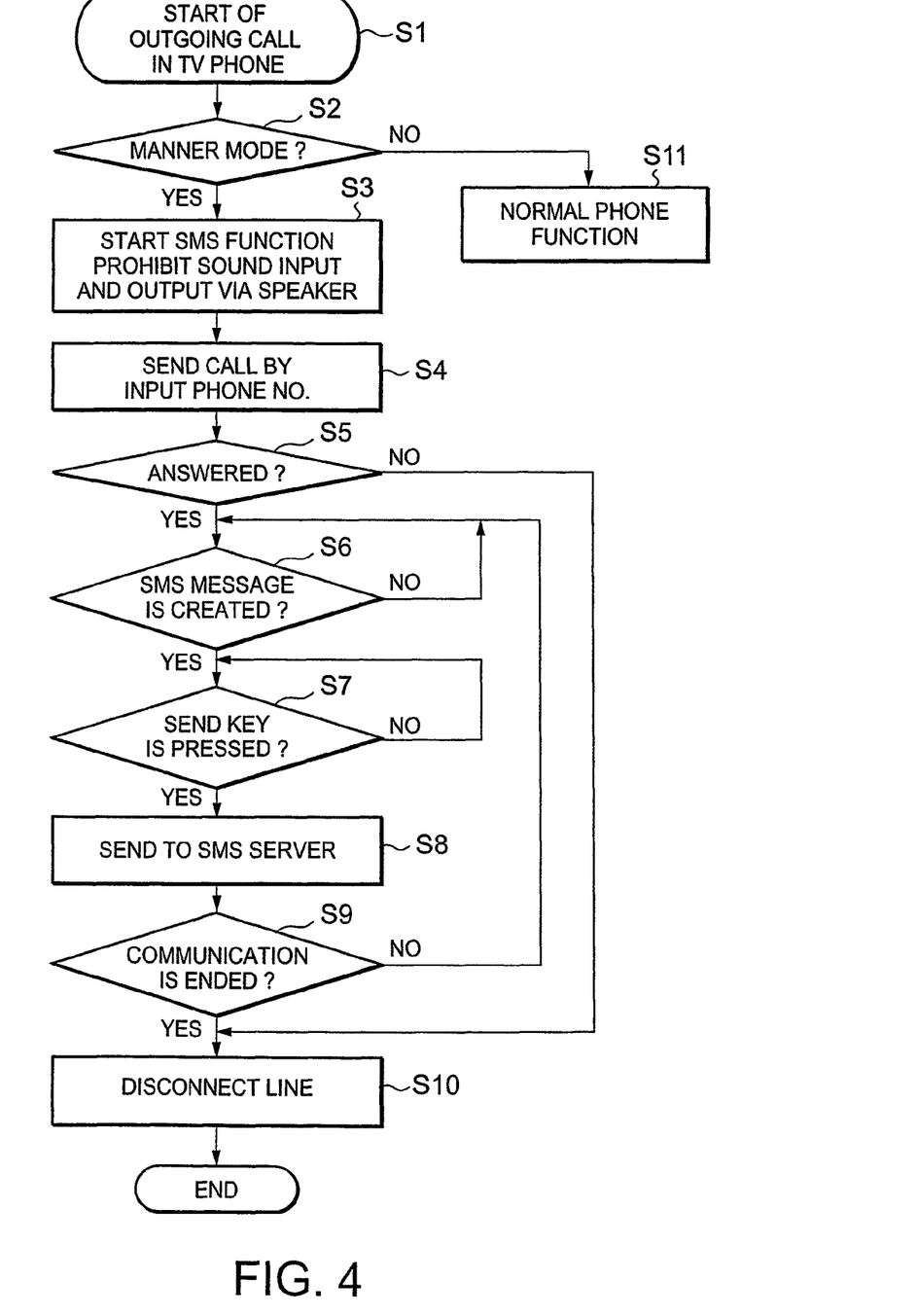
FIG. 4 is a flowchart showing the operation of a call using the mobile TV phone terminal according to the first embodiment.
Figure 5:
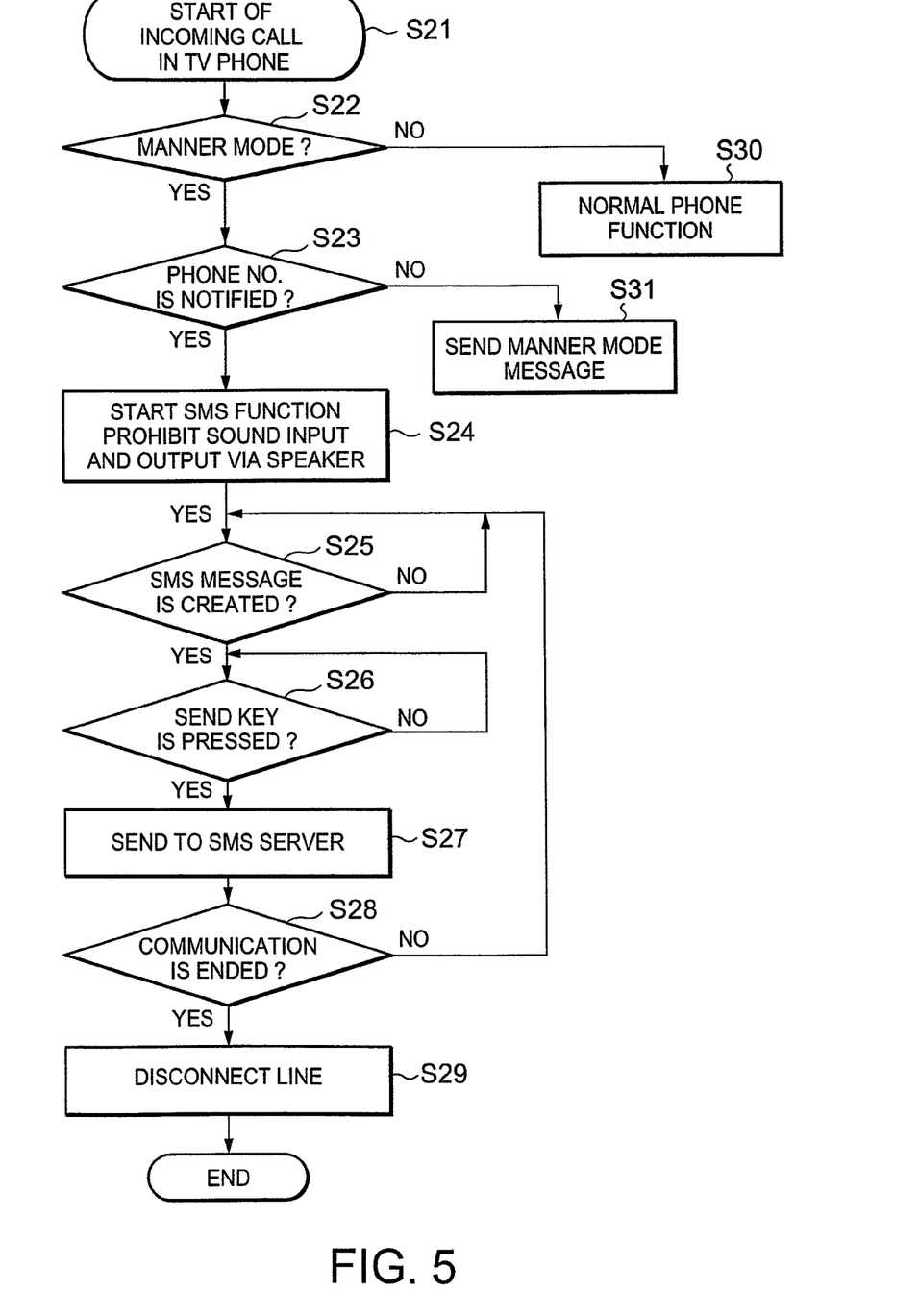
FIG. 5 is a flowchart showing the operation of an receiving call (incoming call) using the mobile TV phone terminal according to the first embodiment.

FIGS. 4 and 5 are flowcharts showing the operation of the sending call and the receiving call (incoming call) using the mobile TV phone terminal according to the first embodiment. Hereinbelow, a description is given of the operation according to the first embodiment with reference to FIGS. 1 to 5.

The start of a sending, or outgoing, call to the mobile TV phone terminal 11 is instructed from the mobile TV phone terminal 10 according to the first embodiment (in step S1). Then, the control unit 108 of the mobile TV phone terminal 10 determines whether or not the manner mode setting/resetting unit 111 sets the manner mode to the mobile TV phone terminal 10 (in step S2). When the manner mode is reset, the control unit 108 controls the operation of the mobile TV phone terminal 10 as the normal TV phone terminal (in step S11). Incidentally, the SMS function of the mobile TV phone terminal 10 is started by the key operating unit 103, thereby operating the SMS function together with the TV phone function.

When the manner mode setting/resetting unit 111 sets the manner mode to the mobile TV phone terminal 10, the control unit 108 that controls the operation of the mobile TV phone terminal 10 controls the operation for prohibiting the sound input via the speaking microphone 105 of the mobile TV phone terminal 10 and the sound output via the receiving speaker 106, and accesses the memory 107 to automatically set up the SMS application so as to operate the SMS function together with the TV phone function (in step S3). In this case, the display unit 102 may display that the speech using the voice is not possible because the manner mode is set.

Next, a phone number of the mobile TV phone terminal 11 is inputted in the mobile TV phone terminal 10 and a sending call is instructed (in step S4). Then, a request of the connection to the mobile TV phone terminal 11 is sent by radio to the base station 41. Information indicating the communication of the character data using the SMS function may be inserted in the connecting request to send such a fact in the response of the mobile TV phone terminal 11.

A response from the mobile TV phone terminal 11 is received (in step S5). Then, a line between the mobile TV phone terminal 10 and the mobile TV phone terminal 11 is connected for communication, the display unit 102 of the mobile TV phone terminal 11 displays the image data sent from the mobile phone terminal 10 via the TV exchanger 30, and the display unit 102 of the mobile TV phone terminal 10 displays the image data sent from the mobile TV phone terminal 11 via the TV phone exchange 30. Next, the key input unit 103 of the mobile TV phone terminal 10 is operated to create an SMS message (in step S6) and a send key is pressed (in step S7). Then, the message data is sent to the SMS server 20 via the base station 41 (in step S8).

The SMS server 20 sends the SMS message to the mobile TV phone terminal 11 via the base station 42 in accordance with the phone number of the mobile TV phone terminal 10 and the phone number of the destination mobile TV phone number 11 included in the message data from the mobile TV phone terminal 10. The mobile TV phone terminal 11 checks whether the received SMS message is from the mobile TV phone terminal 10, and displays the character data at a predetermined position on the display unit 102.

On the side of the mobile TV phone terminal 11, the SMS application starts in response to the message from the mobile TV phone terminal 10, and the SMS message is created and is returned. The SMS message is displayed as the character data at a predetermined position on the display unit 102 of the mobile TV phone terminal 10. As mentioned above, in the situation where the image data sent from the partner is displayed on the display unit 102 on the mobile TV phone terminals 10 and 11, the verbal communication is performed by using the SMS message.

The mobile TV phone terminal 10 may have an ear phone terminal to receive the voice of the other party via the ear phone even in the manner mode. In this case, the mobile TV phone terminal 11 sends, to the mobile TV phone terminal 10, the voice from the speaking microphone 105 of the mobile TV phone terminal 11 by the normal TV phone function, and the mobile TV phone terminal 10 can communicate with the mobile TV phone terminal 11 by the ear phone connected to the ear phone terminal.

Referring to FIG. 5, when the incoming call is received by the mobile TV phone terminal 10 according to the first embodiment (in step S21), the control unit 108 of the mobile TV phone terminal 10 determines whether or not the manner mode setting/resetting unit 111 sets the manner mode to the mobile TV phone terminal 10 (in step S22). When the manner mode is reset, the manner mode setting/resetting unit 111 controls the mobile TV phone terminal 10 to function as the normal TV phone function (in step S30).

When the manner mode setting/resetting unit 111 sets the manner mode to the mobile TV phone terminal 10, the control unit 108 determines whether or not the phone number of the calling party is notified (in step S23). When the calling party calls a TV phone without notification of the phone number, the phone number of the calling party is unknown. Therefore, the SMS application automatically does not start and such a message that the answer is not currently possible in the manner mode is sent (in step S31). Then, the communication ends.

When the phone number of the calling party is notified, the control unit 108 for controlling the operation of the mobile TV phone terminal 10 controls the operation for prohibiting the sound input via the speaking microphone 105 of the mobile TV phone terminal 10 and the sound output via the receiving speaker 106, accesses the memory 107, and automatically starts the SMS application to operate the SMS function together with the TV phone function (in step S24). Then, the control unit 108 sends the SMS message.

That is, the key input unit 103 of the mobile TV phone terminal 10 is operated to create the SMS message (in step S25). The send key is pressed (in step S26). Then, the message data is sent to the SMS server 20 via the base station 41 (in step S27).

The first SMS message to be sent may be a message that is registered in advance to the terminal of the calling party, namely, a message indicating the communication using the SMS function because the voice communication is not allowed.

Normally, the manner mode is manually set/reset. Further, the manner mode may automatically be set/reset in response to a specific signal sent from a sending device indicating that the mobile phone terminal is within a manner mode area where the mobile phone terminal should be used in the manner mode, e.g., a hospital or theater.

Figure 10:
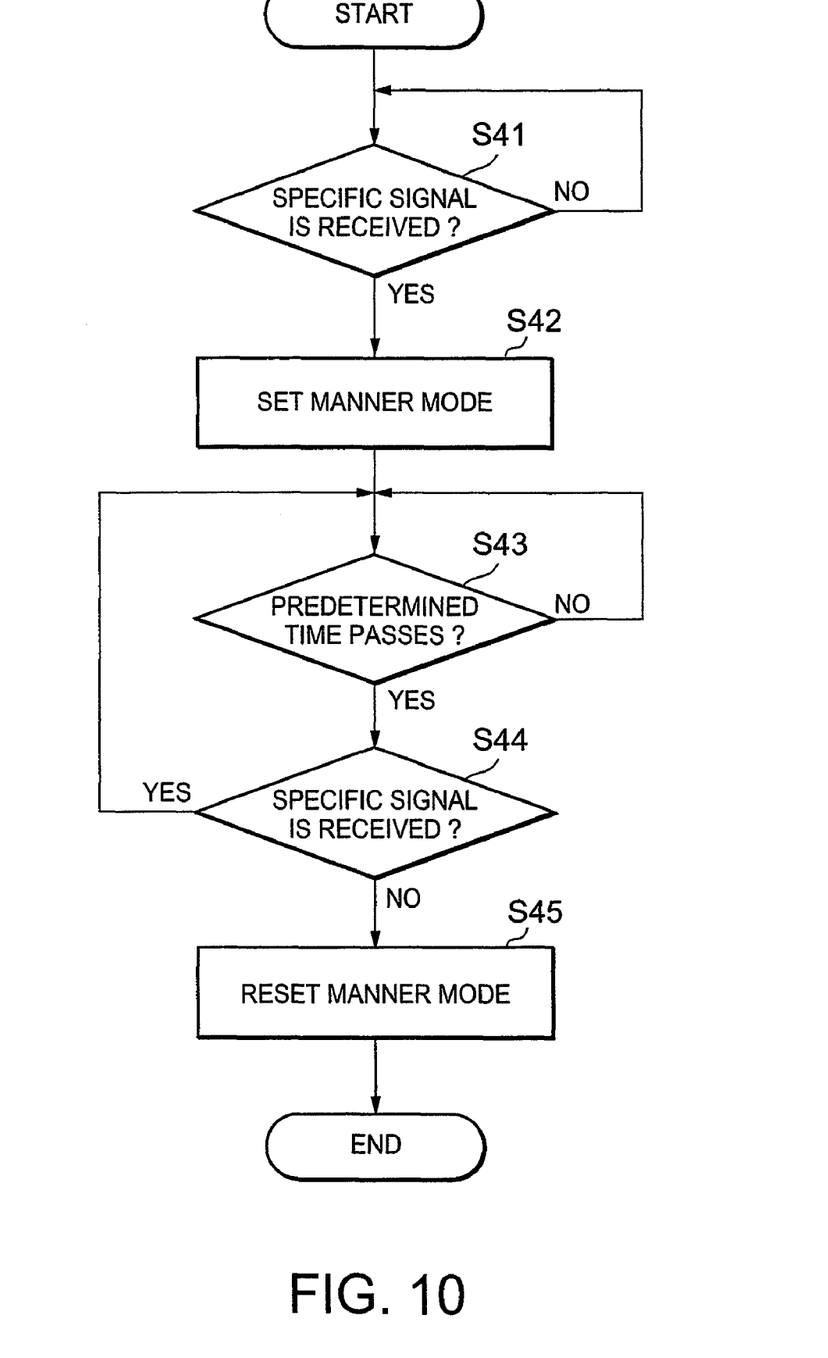
FIG. 10 is a flowchart showing an example of automatically setting and resetting a manner mode of the mobile TV phone terminal according to the present invention.

FIG. 10 is a flowchart showing one example of automatically setting the manner mode. The control unit of the mobile TV phone terminal determines whether or not a specific signal is received (in step S41). When the specific signal is received, the manner mode is set (in step S42). Further, it is determined whether or not a predetermined time passes (in step S43). When it is determined that a predetermined time passes, it is checked again whether or not the specific signal is received (in step S44). When it is determined that the specific signal is not received, the manner mode is reset.

FIGS. 6 to 9 are diagrams schematically showing the display formats of the display unit 102 in the outgoing call or the incoming call in the mobile TV phone terminal according to the first embodiment.

Figure 6:
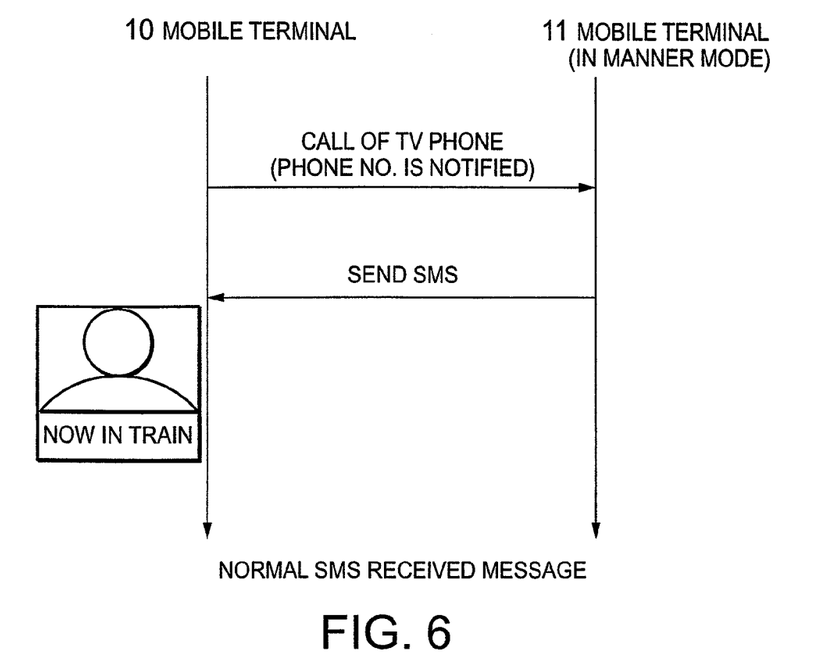
FIG. 6 is a diagram schematically showing an example of a screen in the sending call and the receiving call (incoming call) of the mobile TV phone terminal according to the first embodiment.

As shown in FIG. 6, when a call of the TV phone is sent with the notification of phone number from the mobile TV phone terminal 10 to the mobile TV phone terminal 11 and then the manner mode is set to the mobile TV phone terminal 11, the SMS message is sent to the mobile TV phone terminal 10 from the mobile TV phone terminal 11. The mobile TV phone terminal 10 that receives the SMS message compares the phone number of the mobile TV phone terminal 11 that is currently in progress of communication with the phone number of the SMS message serving as the sender. When the mobile TV phone terminal 10 determines that the phone number of the mobile TV phone terminal 11 is the same as the phone number of the SMS message as the sender, the SMS message is that from the mobile TV phone terminal 11 and therefore a message of the mobile TV phone terminal 11 (e.g., "Now in train") is displayed on the screen of the mobile TV phone terminal 10 that is in progress of TV phone.

Figure 7:
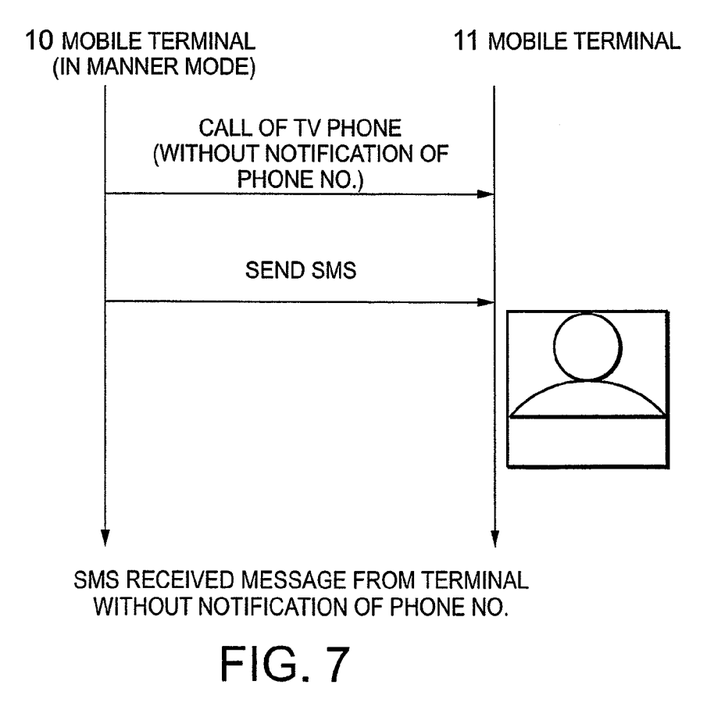
FIG. 7 is a diagram schematically showing another example of a screen in the sending call and the receiving call (incoming call) of the mobile TV phone terminal according to the first embodiment.

Referring to FIG. 7, when the mobile TV phone terminal 10 sends a call of the TV phone without the notification of phone number to the mobile TV phone terminal 11 and the SMS message is sent to the mobile TV phone terminal 11 from the mobile TV phone terminal 10, the mobile TV phone terminal 11 does not display the SMS message on the screen in the TV phone function because the sending terminal during the communication of the TV phone is unknown. Thus, when the manner mode is set to the mobile TV phone terminal 10, only the image data of the sending call side is displayed on the mobile TV phone terminal 11 and the speech communication is not possible.

Figure 8:
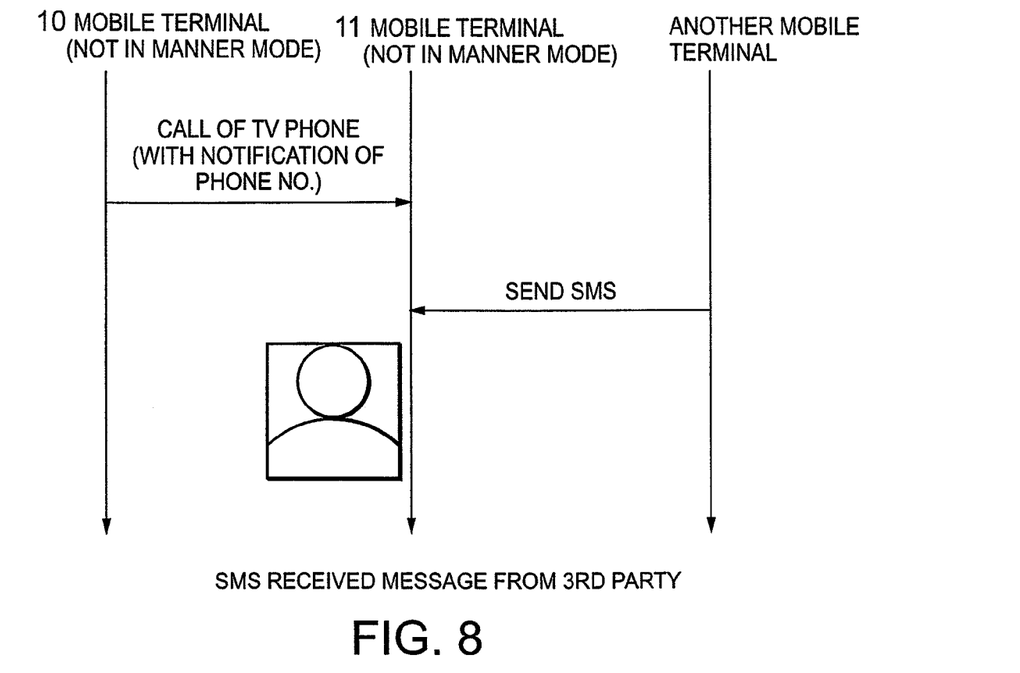
FIG. 8 is a diagram schematically showing yet another example of a screen display in the sending call and the receiving call (incoming call) of the mobile TV phone terminal according to the first embodiment.

Referring to FIG. 8, when the SMS message is sent to the mobile TV phone terminal 11 from another mobile terminal during the communication of the TV phone between the mobile TV phone terminals 10 and 11, the mobile TV phone terminal 11 compares the phone number of the mobile TV phone terminal 10 during the current communication with the phone number of the sent SMS message as the sender, indicating no match in phone number. Therefore, the SMS message is not outputted on the screen of the current TV phone which displays the image data from the mobile TV phone terminal 10.

When the SMS message is sent/received during the communication of the TV phone of the mobile terminal according to the first embodiment of the present invention and the SMS message of a third partner having no relationship to this transmission and reception is received, the operation is controlled so as to prevent the display operation of the message on the screen. Thus, the troublesomeness of communication caused by the SMS message from the third partner without any relationship is prevented and the convenience is further improved.

Figure 9:
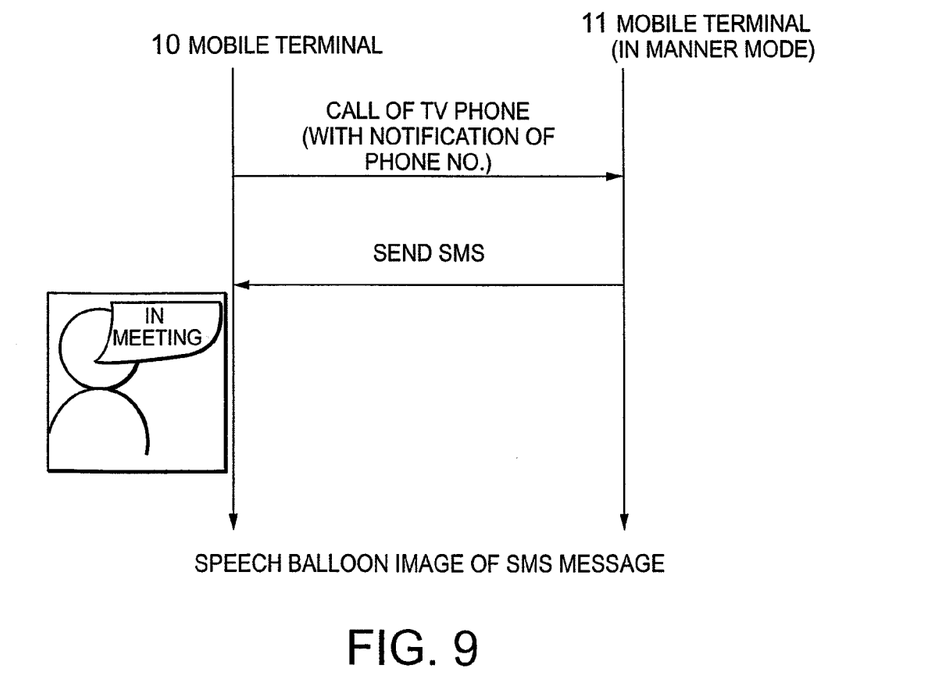
FIG. 9 is a diagram schematically showing still another example of a screen display in the sending call and the receiving call (incoming call) of the mobile TV phone terminal according to the first embodiment.

FIG. 9 shows another example of the display format of the message displayed on the display screen. In FIG. 9, the sender's image displayed on the display unit 102 may be recognized, the mouth position of a displayed person may be estimated, a speech balloon may be set, and the message may be outputted in the overlapping state to the sender's image. In this case, when the number of characters is large, a long message can be displayed by properly replacing and outputting the speech balloon with the pressing operation of button. Further, a signal which overlaps an X mark to the sender's mouth and displays it may be sent and a message indicating that the communication using the voice is not allowed may be sent. Means for overlapping a specific character or image to the video image may be set so that the means is properly switched on/off on the terminal side.

According to the first embodiment, the communication is executed in the manner mode by combining the TV phone function and the SMS message function. According to the second embodiment, the mobile terminal includes a phone book function and an email function, in place of the SMS function, and the character message is received/sent by using the email in place of the SMS function.

For example, when a call is sent to the mobile TV phone terminal 11 while the mobile TV phone terminal 10 is in the manner mode, the message is sent by the email by searching for an email address of the receiving call side from among a phone book. The message is received and is displayed when the email address of the sender sent therefrom is searched and the email address of the sender is the same as the phone number of the sender (mobile TV phone terminal 11) during the communication of the TV phone. Thus, the message is sent/received to/from the sender during the communication of TV phone in the manner mode.

According to the third embodiment, the mobile phone includes the TV phone function, a function for converting the character data into a voice signal and sending the converted voice signal, and a function for converting the received voice signal into the character data. In the communication of TV phone in the manner mode, the converting function of the voice and the character data starts, thereby executing the communication using the character message.

When the call is sent to the mobile TV phone terminal 11 from the mobile TV phone terminal 10 in the manner mode, the function for converting the character data into the voice data and sending the voice data and the function for converting the received voice data into the character data simultaneously start together with the TV phone function. The character data inputted from the key input unit 103 in the mobile TV phone terminal 10 is converted into the voice signal by the function for converting the character data into the voice, and is sent to the mobile TV phone terminal 11. Further, the display unit 102 of the mobile TV phone terminal 10 displays the image received from the mobile TV phone terminal 11 by the TV phone function, and the received voice signal is converted into the character data by function for converting the voice into the character data and is displayed. Thus, the message is received/sent by using the character from/to the sender during the communication of TV phone in the manner mode.

Software (sound synthesizing program and sound recognizing program) in cooperation with the control unit 108 is stored in the memory 107 and the function for converting the character data into the voice data and sending the voice data and the function for converting the voice data into the character data can be realized by the operation together with the TV phone function upon starting the converting function of the voice and character data.

What is claimed is:

1. A receiving and sending method of a mobile TV phone having a TV phone function, a Short Message Service (SMS) function, together with a function for setting and resetting a manner mode, the method comprising:
    prohibiting a sound input via a microphone and a sound output via a speaker of the mobile TV phone and starting the SMS function together with the TV phone function, upon executing a communication by the TV phone function in the manner mode;
    sending, via an SMS server by the SMS function, character data inputted from a key input unit of the mobile TV phone;
    displaying, on a display unit of the mobile TV phone, a message from a sender's mobile TV phone terminal received by the SMS function and an image from the sender's mobile TV phone terminal received by the TV phone function; and
    prohibiting the display operation of the SMS message from a third party until ending the communication by the TV phone function, upon receiving the SMS message from the third party in the communication by the TV phone function.

2. A receiving and sending method of a mobile TV phone according to claim 1, further comprising:
    overlaying the message to the image from the sender's mobile TV phone terminal received by the TV phone function and displaying the overlaid message in a speech balloon format.

3. A mobile radio terminal having manner-mode setting/resetting means with a TV phone function and a Short Message Service (SMS) function, the mobile radio terminal comprising:
    means for prohibiting a sound input via a microphone and a sound output via a speaker of the mobile radio terminal and starting the SMS function together with the TV phone function, upon executing a communication by the TV phone function in the manner mode set by the manner-mode setting/resetting means;
    means for sending, via an SMS server by the SMS function, character data inputted from a key input unit of the mobile radio terminal;
    means for displaying, on a display unit of the mobile radio terminal, a message from a sender's mobile radio terminal received by the SMS function and an image from the sender's mobile radio terminal received by the TV phone function; and
    means for prohibiting the display operation of the SMS message from a third party until ending the communication by the TV phone function, upon receiving the SMS message from the third party in the communication by the TV phone function.

4. A mobile radio terminal according to claim 3, further comprising:
    means for overlaying the message to the image from the sender's mobile radio terminal received by the TV phone function and displaying the overlaid image in a speech balloon format.

5. A mobile radio terminal according to claim 3, further comprising:
    an ear phone terminal,
    wherein the sound from the sender's mobile radio terminal can be received by an ear phone connected to the ear phone terminal in the manner mode.

6. A mobile radio terminal according to claim 3, wherein the manner-mode setting/resetting means comprises means for automatically setting the mobile radio terminal to the manner mode on receipt of a predetermined signal indicating a specific area and resetting the manner mode when the mobile radio terminal shifts out of the specific area.

* * * * *